US011933601B2

(12) United States Patent
Carlu et al.

(10) Patent No.: US 11,933,601 B2
(45) Date of Patent: Mar. 19, 2024

(54) METHOD FOR MEASURING GEOMETRIC DEVIATIONS BETWEEN THE DISHED SURFACES OF A PLURALITY OF MATERIALS TO BE ASSESSED AND A DISHED SURFACE OF A REFERENCE MATERIAL

(71) Applicant: SAINT-GOBAIN GLASS FRANCE, Courbevoie (FR)

(72) Inventors: Adrien Carlu, Amiens (FR); Alexandre Marlier, Pontoise les Noyon (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 374 days.

(21) Appl. No.: 17/296,436

(22) PCT Filed: Dec. 6, 2019

(86) PCT No.: PCT/EP2019/083920
§ 371 (c)(1),
(2) Date: May 24, 2021

(87) PCT Pub. No.: WO2020/120294
PCT Pub. Date: Jun. 18, 2020

(65) Prior Publication Data
US 2022/0018653 A1 Jan. 20, 2022

(30) Foreign Application Priority Data
Dec. 12, 2018 (FR) .................................. 1872770

(51) Int. Cl.
*G01B 11/24* (2006.01)
*B25J 17/02* (2006.01)

(52) U.S. Cl.
CPC ........... *G01B 11/24* (2013.01); *B25J 17/0283* (2013.01)

(58) Field of Classification Search
CPC ........ B25J 17/0283; B25J 19/025; B25J 9/16; B25J 9/1692; B82Y 40/00; C22C 1/11;
(Continued)

(56) References Cited

U.S. PATENT DOCUMENTS 3,733,704 A 5/1973 Farabaugh
4,221,053 A 9/1980 Bobel, II et al.
(Continued)

FOREIGN PATENT DOCUMENTS

DE 10 2006 016677 A1 10/2007
DE 10 2016 120557 A1 5/2018
(Continued)

OTHER PUBLICATIONS

International Search Report as issued in International Patent Application No. PCT/EP2019/083920, dated Mar. 5, 2020.
(Continued)

*Primary Examiner* — Tri T Ton
(74) *Attorney, Agent, or Firm* — Pillsbury Winthrop Shaw Pittman LLP

(57) ABSTRACT

An automated method measures geometric curvature deviations between dished surfaces of a plurality of materials to be assessed and a dished surface of a reference material. The
(Continued)

method calculates, by computer, at selected points, a difference between the curvature profiles of the dished surface of each material to be assessed and a relief height or curvature profile of the dished surface of the reference material.

18 Claims, 3 Drawing Sheets

(58) Field of Classification Search
CPC ......... C22C 45/00; G01B 11/24; G01B 11/30; G01B 21/042; G01B 2210/50; G01B 11/005; G01L 1/246; G01L 5/0038; G01N 21/958; G05B 2219/40293; G05B 2219/40575; G05B 2219/40625
USPC .................................................. 356/600–640
See application file for complete search history.

(56) References Cited

U.S. PATENT DOCUMENTS

| | | | |
|---|---|---|---|
| 4,679,331 A | 7/1987 | Koontz | |
| 5,426,861 A | 6/1995 | Shelton | |
| 10,599,031 B2 * | 3/2020 | Okamura | G03F 1/24 |

| | | | |
|---|---|---|---|
| 2009/0291262 A1 | 11/2009 | Subra et al. | |
| 2014/0046589 A1 | 2/2014 | Metzler et al. | |
| 2018/0112966 A1 | 4/2018 | Matsumiya et al. | |

FOREIGN PATENT DOCUMENTS

| | | |
|---|---|---|
| EP | 0 453 433 A2 | 10/1991 |
| EP | 0 342 127 B1 | 11/1994 |
| EP | 0 463 940 B1 | 2/1995 |
| EP | 1 176 388 A2 | 1/2002 |
| EP | 1 061 357 B1 | 5/2006 |
| GB | 2 152 210 A | 7/1985 |
| JP | H09-257657 A | 10/1997 |
| JP | 2010-513078 A | 4/2010 |
| JP | 2014-513792 A | 6/2014 |
| JP | 2017-172984 A | 9/2017 |
| JP | 2018-066670 A | 4/2018 |
| JP | 2018-510338 A | 4/2018 |
| WO | WO 98/17993 A2 | 4/1998 |
| WO | WO 2016/052248 A1 | 4/2016 |
| WO | WO 2016/140753 A1 | 9/2016 |

OTHER PUBLICATIONS

Notice of Reasons for Rejection as issued in Japanese Patent Application No. 2021-533673, dated Jul. 18, 2023.

* cited by examiner

[Fig. 1]
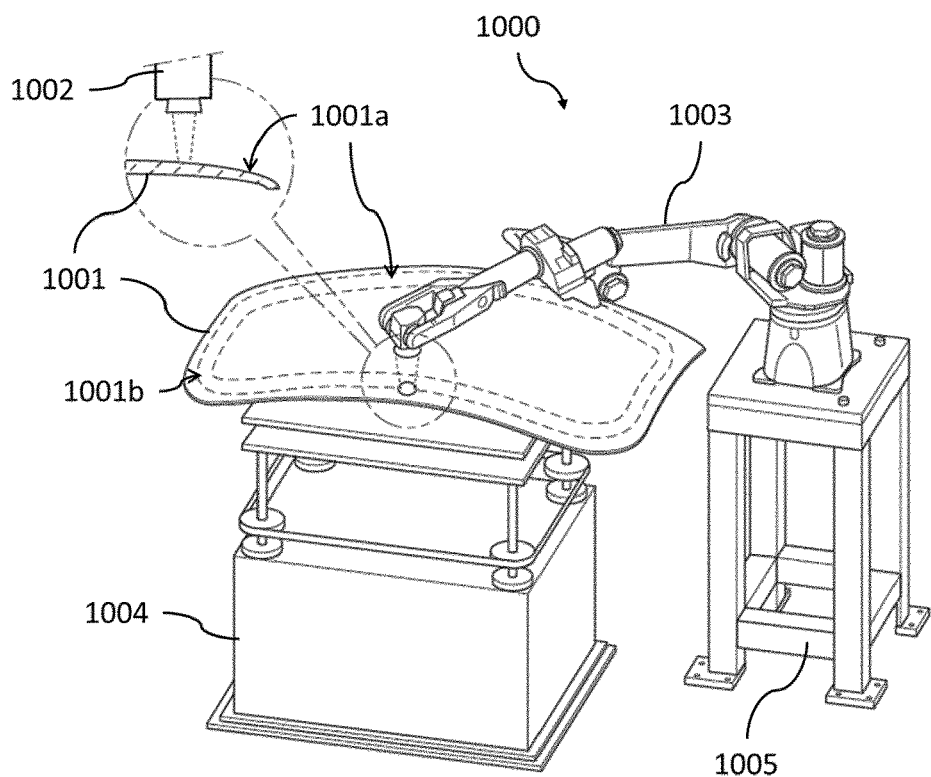
[Fig. 2]
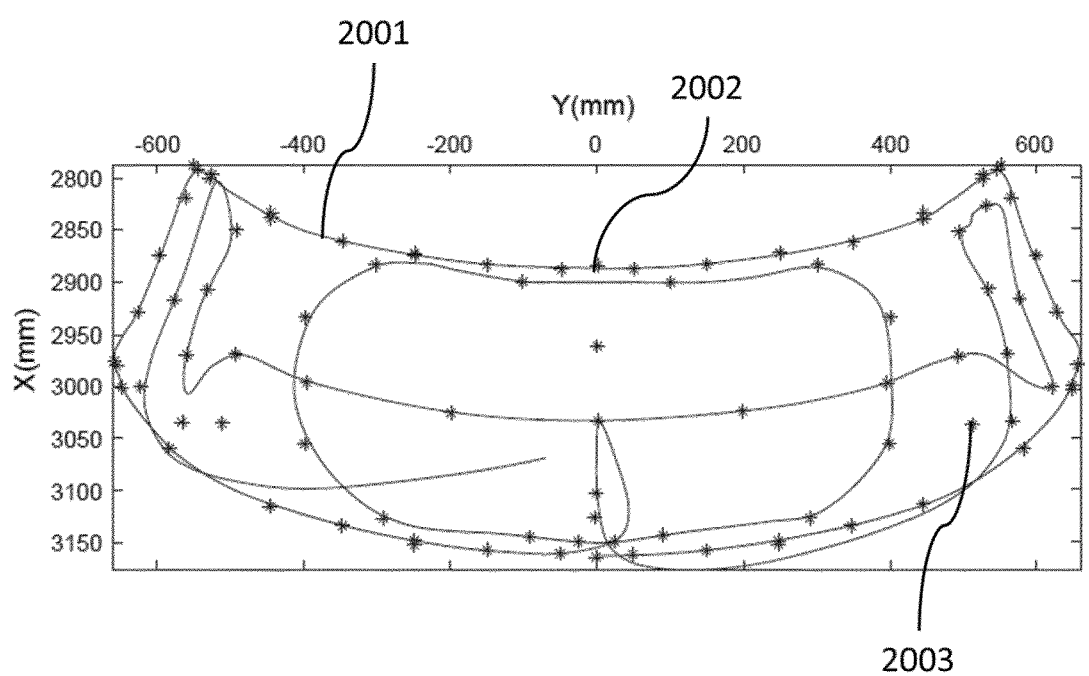

[Fig. 3]
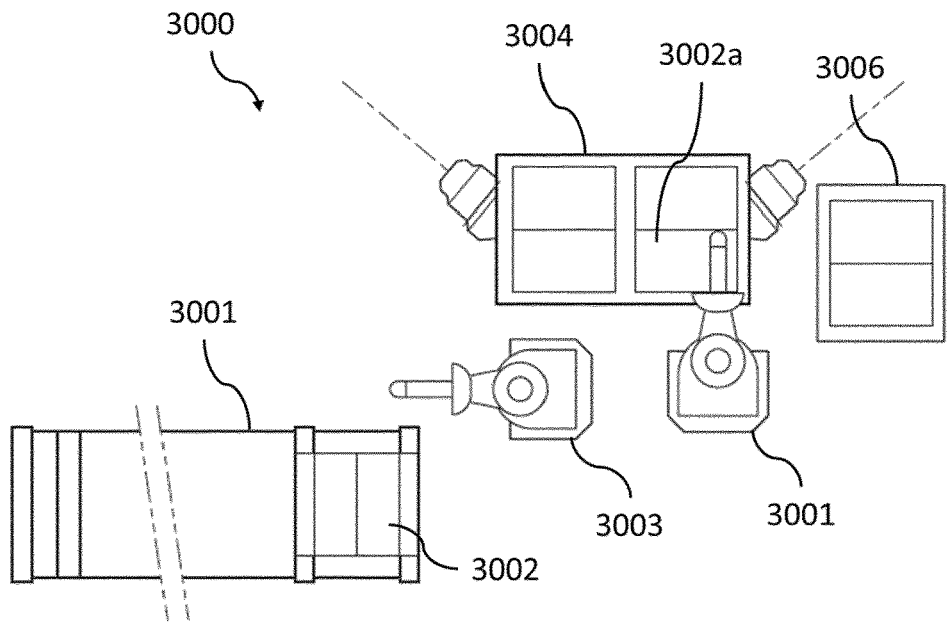
[Fig. 4]
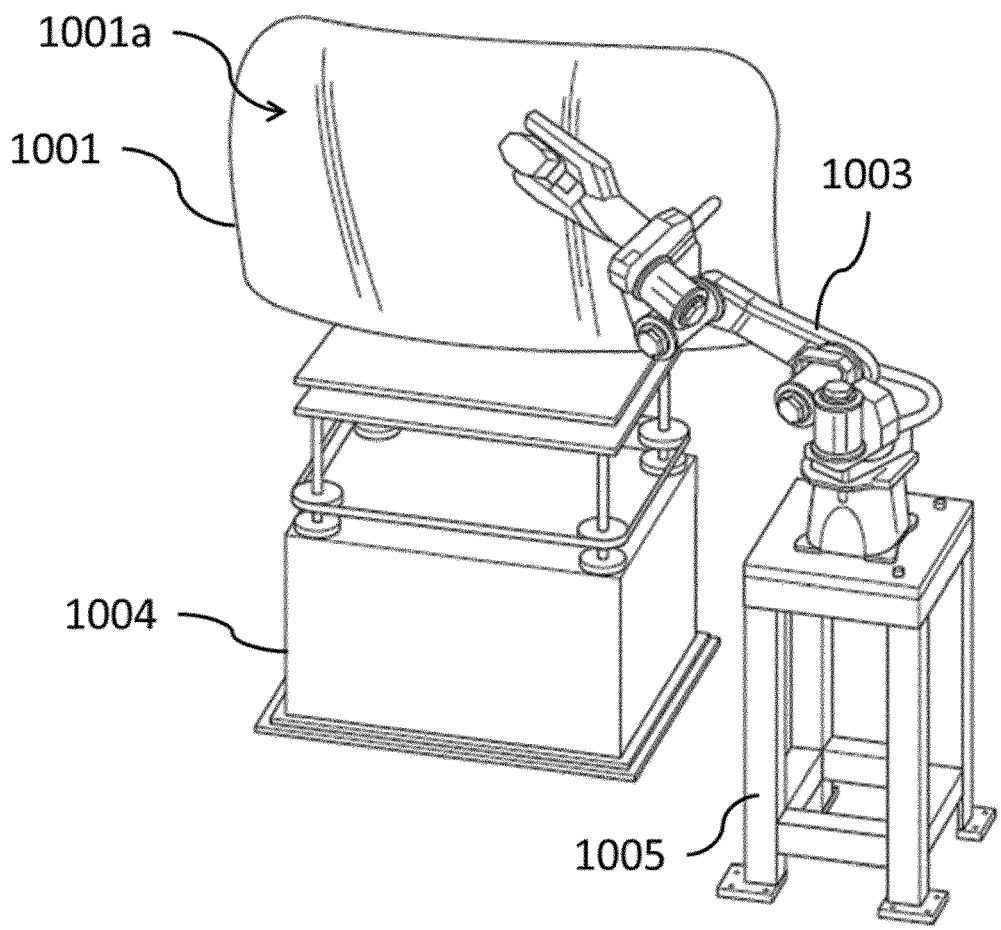

[Fig. 5]
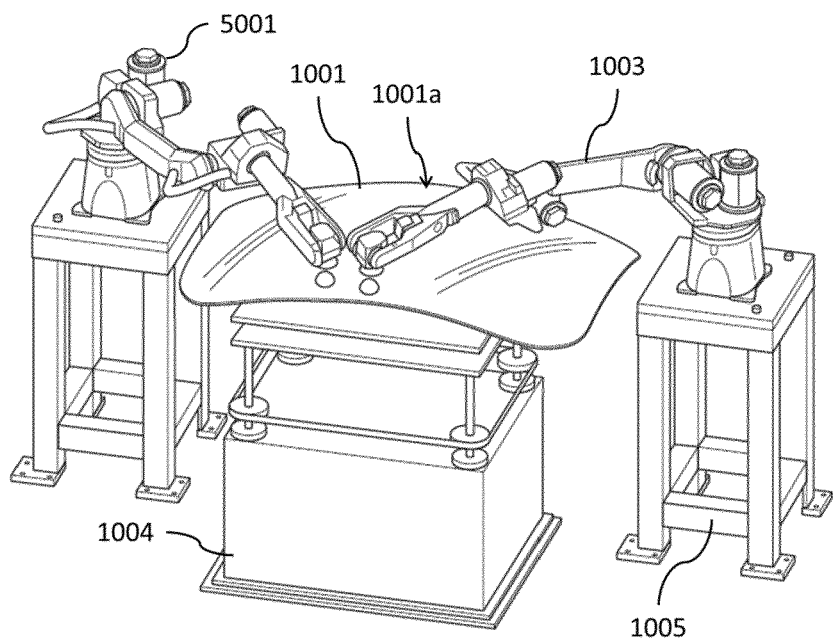

METHOD FOR MEASURING GEOMETRIC DEVIATIONS BETWEEN THE DISHED SURFACES OF A PLURALITY OF MATERIALS TO BE ASSESSED AND A DISHED SURFACE OF A REFERENCE MATERIAL

CROSS-REFERENCE TO RELATED APPLICATIONS

This application is the U.S. National Stage of PCT/EP2019/083920, filed Dec. 6, 2019, which in turn claims priority to French patent application number 1872770 filed Dec. 12, 2018. The content of these applications are incorporated herein by reference in their entireties.

The present invention relates to the field of the checking of the reliefs of the dished surfaces of materials, in particular of the dished surfaces of glazings adapted for transport means, notably for the motor vehicle industry.

The subject of the invention is a method and a system for measuring geometric deviations between the dished surfaces of a plurality of materials to be assessed and a dished surface of a reference material.

The general relief and curvature of the surfaces of the materials, in particular the dished surfaces, can prohibit quality criteria if they do not satisfy the constraints put in place for their applications or their uses.

For example, in the glass industry, the production of glazings for applications in the field of transport means such as motor vehicles often comprises a step of forming of sheets of mineral glass in order to confer upon them a certain curvature. This curvature, the radii of curvature of which can vary all along the surface of the sheet of glass, is necessary for the glazing formed by the glass sheets to be able to be fixed onto or inserted into the framework of the vehicle. That contributes, among other things, to the general esthetics sought by the vehicle constructor, in the mechanical, thermal and acoustic efficiencies of the zones of fixing and of insertion of the glazing in the framework and in the optical efficiencies of the glazing depending on whether it is used as windshield or side glazing.

The clients, such as the vehicle constructors, the integrators and/or the transformers, thus define strict specifications concerning the acceptable tolerances for the surface state of the glazings with respect to their relief and/or to the geometry of their curvature. Generally, a physical or digital model glazing is established for the particular application on a vehicle, for example a windshield, and on which control points are defined. These control points can correspond to zones of fixing onto the framework of the vehicle or even zones of vision for the driver and/or the passengers.

Ideally, there should be no surface relief or geometry defect at these control points and at the very most the characteristics of the defect should be within the tolerances that are acceptable to the client or clients. In all cases, a defect, if present, should not be able to hamper the fixing of the glazing on the vehicle or be likely to reduce the visual comfort of the driver or hamper the driving of the vehicle. Likewise, if the glazing is used in a digital display device, such as a plasma screen or a liquid crystal screen, or comprises such a device, no defect should disrupt the display.

Many methods for checking the quality of the glazings have been developed so as to be able to isolate and eliminate those whose optical characteristics are unsuited to the use for which they are intended. These methods are often implemented during or after production. They are described in detail in the state of the art.

For example, the patents EP 0463940 B and EP 0342127 B describe automatable optical glazing inspection methods in which the levels of optical deformation of the glazing are determined from a shadowgraphic image then compared to previously defined threshold values. The patent applications WO 98/17993 and GB 2152210, as well as the patent EP 1061357 B, disclose methods for detecting optical anomalies of a transparent sheet through analysis of the image of a geometric pattern reflected or transmitted by the sheet.

However, these methods do not make it possible to isolate the glazings in which the glass sheets exhibit, on the surface, geometric relief or curvature deviations with the surface of a model glazing.

There are also contact-based devices or methods which make it possible to determine whether the contours of an article, such as a glass sheet, correspond to those of a template. For example, the application U.S. Pat. No. 3,733,704 A describes a support whose periphery is provided with a plurality of feeler potentiometers, and on which an object is disposed such that the feeler potentiometers determine the contour thereof. The application U.S. Pat. No. 4,221,053 A describes a device having the form sought for the glass sheet to be examined and whose periphery is provided with a plurality of feeler potentiometers. A glass sheet is disposed under the device such that the feeler potentiometers, by entering into contact with the surface of the glass sheet, determine the contour thereof to check that it corresponds to that of the device. The application U.S. Pat. No. 4,679,331 A discloses a device comprising an articulated arm onto which is fixed a single feeler potentiometer. The articulated arm moves to certain points situated on the periphery of a glass sheet placed on a template and places the feeler potentiometer in contact with the surface of the glass sheet. A thickness difference between the surface of the glass and the surface of the template is calculated. This difference indicate whether the glass sheet contour corresponds to that of the template.

These contact-based methods and devices present a number of drawbacks. First of all, they require, for each glass sheet form, a specially adapted and designed template. In an industrial context where a certain flexibility and a certain responsiveness are required given the rapid changes in the technical needs of the clients, that causes additional delays and costs linked notably to the development of a template for each form and for the maintenance thereof. That also creates risks of degradation, such as scratching or scoring, and/or pollution of the surfaces of the glass sheets, above all when the templates and the contact-based surface detection means are degraded under the effect of their natural wear. Then, the use of contact-based surface detection means, such as the feeler potentiometers, is unsuitable for certain articles. The particular case of the glazings comprising a thin mineral glass, of a thickness generally lying between 0.4 mm and 1.5 mm, is particularly illustrative. Because of its small thickness, the thin glass is sensitive to any mechanical surface strain. The result may be optical deformations that are prohibitive for certain applications. The contact-based surface detection means are therefore to be avoided. Finally, these contact-based devices and methods are inappropriate for measuring geometric deviations at any point of a surface within a time that is consistent with the pace of a production line. Measuring geometric deviations at any point using the contact-based devices and methods is slow. The exploration of an entire surface takes too long for them to be effectively incorporated on a continuous, high rate production line.

The present invention resolves these problems. Its subject is an automated method for measuring geometric relief or curvature deviations between the dished surfaces of a plurality of materials to be assessed and a dished surface of a reference material, said method comprising the following steps:
- (a) the measurement, at selected measurement points along a defined trajectory, of the relief height or curvature profile of the dished surface of the reference material using a contactless detection means, said contactless detection means being disposed on an automatic displacement means travelling along said trajectory synchronously with the measurement of the relief height or of the curvature by the contactless detection means;
- (b) the measurement of the relief height or curvature profile of the dished surface of each material to be assessed, at the same selected measurement points along the same trajectory, in the same conditions of travel along said trajectory by the automatic displacement means and according to the same angle of acquisition by the contactless detection means at the same measurement point as for the dished surface of the reference material during the step (a);
- (c) the calculation, implemented by computer, at the selected points, of the difference between the relief height or curvature profiles of the dished surface of each assessment material obtained in the step (b) and the relief height or curvature profile of the dished surface of the reference material obtained in the step (a).

A system making it possible to implement the method of the invention is also a subject of the invention. This system is an automatic system for measuring geometric relief or curvature deviations between the dished surfaces of a plurality of materials to be assessed and a dished surface of a reference material, said system comprising an assembly formed by at least one automatic displacement means adapted to travel along at least one trajectory defined along the dished surfaces, and at least one contactless detection means adapted to measure the height of the relief or curvature of surfaces, disposed on the automatic displacement means and synchronized with the movements of said automatic displacement means; said system being configured to:

measure, at selected measurement points along a defined trajectory, the relief height or curvature profile of the dished surface of the material, relative to the normal to said dished surface at the measurement point, and measure the relief height or curvature profile of the dished surface of each material to be assessed, at the same selected measurement points along the same trajectory, in the same conditions of travel along said trajectory by the automatic displacement means and according to the same angle of acquisition by the contactless detection means at the same measurement point as for the dished surface of the reference material.

FIG. 1 is a schematic representation of an embodiment of a method and of a system according to the invention.

FIG. 2 is a graphic representation of an example of trajectory defined for the measurement of the optical deviations according to the method of the invention.

FIG. 3 is a schematic representation of a production line incorporating a method and a system according to the invention.

FIG. 4 is a schematic representation of a second embodiment of a method according to the invention.

FIG. 5 is a schematic representation of a third embodiment of a method according to the invention.

Hereinafter in the text, reference is made to the elements of the figures in their different views.

FIG. 1 represents an embodiment of a method according to the invention.

The method according to the invention is an automated method 1000 for measuring geometric relief or curvature deviations between the dished surfaces 1001a of a plurality of materials 1001 to be assessed and a dished surface 1001a of a reference material 1001 (not represented). For the purposes of simplification of the figures, the materials to be assessed and the reference material are represented by one and the same element 1001 in the figures.

The method comprises the following steps:
- (a) the measurement, at selected measurement points along a defined trajectory 1001b, of the relief height or curvature profile of the dished surface 1001a of the reference material 1001 using a contactless detection means 1002, said contactless detection means 1002 being disposed on an automatic displacement means 1003 travelling along said trajectory 1001b synchronously with the measurement of the relief height or curvature by the contactless detection means 1002;
- (b) the measurement of the relief height or curvature profile of the dished surface 1001a of each material 1001 to be assessed, at the same selected measurement points along the same trajectory 1001b, in the same conditions of travel along said trajectory 1001b by the automatic displacement means 1003 and according to the same angle of acquisition by the contactless detection means 1002 at the same measurement point as for the dished surface 1001a of the reference material during the step (a);
- (c) the calculation, implemented by computer (not represented) at the selected points, of the difference between the relief height or curvature profiles of the dished surface 1001a of each assessment material 1001 obtained in the step (b) and the relief height or curvature profile of the dished surface 1001a of the reference material 1001 obtained in the step (a).

The angle of the axis of acquisition of the contactless detection means 1002 can advantageously lie between 0 and 40°, preferably between 0 and 20°, relative to the normal to said dished surface at the measurement point. Such an angle can make it possible, for example, to avoid the measurement artifacts which can appear when an excessively large zone of the dished surfaces is the subject of a measurement by the contactless detection means 1002.

The automatic displacement means can be disposed on a fixed support 1005 adapted and situated so as to allow it to reach all or some of the points of the dished surfaces of the materials to be assessed and of the reference material. The support can also be a mobile support. Likewise, the materials to be assessed and the reference material can be disposed on a fixed support 1004. The support 1004 can also be mobile. Such is the case, for example, of a conveyor which routes said materials and which is temporarily immobilized for the time it takes for a measurement of the geometric deviations according to the method of the invention.

In some applications, the required characteristics or the acceptable tolerances with respect to the relief or the curvature of the dished surface of the materials can vary. For example, in the case of a glazing for applications on a transport vehicle, the acceptable tolerances with respect to the curvature or to the relief in the zones of the glazing intended to be fixed onto the framework of the vehicle can be different from those of the zones intended to serve as zones of vision for the driver of the vehicle.

In this sense, in one embodiment of the method according to the invention, said method can further comprise, after the step (c), a step (d) of comparison, at selected measurement points, of the values of the differences calculated during the step (c) with tolerance values previously defined at each of said points. The selected measurement points can equally also be a few points along the trajectory, the set of the points forming the trajectory, and comprise measurement points outside of said trajectory.

As an example, FIG. 2 represents, in plan view, a dished surface 1001a of a reference or assessment material 1001. On this surface, there is represented an example of trajectory 2001 that the method according to the invention makes it possible to configure and travel along for the measurement of the relief height or curvature profile of the dished surface 1001a. Measurement points 2002, 2003 can be selected on or outside of the trajectory 2001. This figure illustrates the flexibility of the method of the invention in that it makes it possible to adapt the trajectories 1001b and measurement points according to the type of material and its use and to compare the relief or curvature values thereof with tolerance values defined for each of these points.

These days, most of the automatic displacement means 1003 and of the contactless detection means 1002 are controlled and interfaced using computer systems comprising computation means capable of processing instructions to operate them. When such systems are used, the trajectory 1001b along which the relief or curvature profile of the dished surfaces 1001a is measured can advantageously be defined using a digital model of the reference dished surface. Such a model can, for example, be produced using computer-aided design software.

The method according to the invention involves the use of the spatial coordinates of the points of the trajectory 1001b along which the measurement of the relief height or curvature is performed. These coordinates can be defined according to a reference frame of reference situated in the space of the trajectory 1001b likely to be travelled along the dished surfaces 1001a of the materials or within the reference frame of reference of the assembly formed by the automatic displacement means and the contactless detection means. The reference frame of reference of the assembly formed by the automatic displacement means 1003 and the contactless detection means 1002 is generally the reference frame of reference of the automatic displacement means 1003.

In general, the automatic displacement means 1003 are controlled using one or more control devices to which instructions are communicated in order to cause these automatic means to be displaced according to a defined trajectory 1001b. The spatial coordinates of this trajectory 1001b are then often defined in the reference frames of reference specific to the automatic displacement means 1003. Now, in practice, and particularly in a production site, the spatial coordinates of the trajectory 1001b, along which the measurement of the relief height or of the curvature of the dished surfaces 1001a is performed, are defined in another, external reference frame of reference, such as that of the production site or that of a manufacturing method or device. It is therefore, in these particular cases, advantageous to calibrate the displacements of the assembly formed by the automatic displacement means 1003 and the contactless detection means 1002 in the external reference frame of reference in order to ensure that said assembly travels along the right trajectory 1001b and that this travel is reproducible.

In this sense, it can be advantageous for the method of the invention to further comprise, before the step (a), a step (a') of calibration of the reproducibility of the spatial positionings of the assembly formed by the automatic displacement means 1003 and the contactless detection means 1002 in the space of the trajectory likely to be travelled along in the step (a), said step (a') comprising the following substeps:

(a'1) the definition of a plurality of points of calibration of known spatial coordinates in a first reference frame of reference in the space comprising the trajectory 1001b likely to be travelled along in the step (a);

(a'2) the acquisition by the assembly formed by the automatic displacement means 1003 and the contactless detection means 1002 of the spatial coordinates of said calibration points in the reference frame of reference of said assembly formed by the automatic displacement means 1003 and the contactless detection means 1002;

(a'3) the calculation, implemented by computer, of the statistical correlation function between the spatial coordinates obtained in the step (a1) and the spatial coordinates obtained in the step (a'2);

(a'4) the implementation of the statistical correlation function in a device for controlling the movements of said assembly formed by the automatic displacement means and the contactless detection means.

The statistical correlation function can be a linear or multilinear regression function. It can also be calculated using a statistical learning algorithm. In particular, the calculation of the statistical correlation function is performed using a least squares regression method.

The method according to the invention can be incorporated in a continuous material manufacturing method. The steps (b) and (c) of the method can then be executed successively and continually on the dished surfaces of the materials. FIG. 3 represents an example of production line in which the method of the invention is incorporated. The line 3000 comprises a conveyor 3001 on which are conveyed glass sheets 3002 originating from the production method (not represented). The glass sheets 3002 having a dished surface are displaced to a first automaton 3003 having a gripping means so as to transfer a glass sheet 3002a onto a fixed support 3004. A system 3005 comprising an automatic displacement means onto which is fixed a contactless detection means implements the method of the invention. The measurement, at selected measurement points along a defined trajectory, of the relief height or curvature profile of the dished surface of a reference glass sheet has previously been performed.

If geometric relief or curvature deviations between the dished surfaces of the glass sheet 3002a and the dished surface of the reference glass sheet do not satisfy the criteria sought, the latter is downgraded or scrapped on a support 3006 provided for that purpose. If they are satisfactory, the glass sheet 3002a is retained and stacked on a support (not represented) provided for that purpose, in preparation, for example, for it to be shipped to the client. Each glass sheet 3002 brought by the conveyor 3001 is successively treated thus.

In the method according to the invention, the materials to be assessed and the reference material, and consequently their respective dished surfaces, be disposed horizontally or with a certain inclination. FIG. 4 is a schematic representation of the method of the invention in which the glazing 1001 is inclined.

In particular, the dished surfaces 1001*b* of the assessment materials 1001 and of the reference material 1001 can be spatially oriented according to angles of inclination corresponding to those likely to be provided during their use. Such a disposition can, for example, make it possible to take account of the mechanical deformations of the material and of its dished surface which can potentially arise in the conditions of its use.

As an example, a laminated glazing of mineral glass, such as a transport vehicle windshield, is not generally disposed horizontally on the vehicle but has a certain inclination relative to the vertical. Also, this glazing is generally fixed to the frame of the vehicle by its periphery. Such a configuration is likely to generate a deformation of the curvature of its surface, above all if it is of large size and fairly thin. The method of the invention can make it possible, in the measurement of the geometric deviations, to take account of this deformation of the curvature by disposing the glazing according to a spatial orientation according to the angle of inclination corresponding to its use. It is also possible to dispose it on a support simulating these conditions of fixing to the framework of the vehicle.

The contactless detection means 1002 can be a chromatic confocal sensor. The operation of chromatic confocal sensors rely on a division of an electromagnetic beam into different wavelengths as a function of the distance with respect to the output objective of said beam. They make it possible to measure the height of the reliefs of a surface with a high lateral resolution. The use of a chromatic confocal sensor, in particular a digital chromatic confocal sensor, can be advantageous in that this type of sensor allows for a contactless measurement with an acquisition frequency and a resolution compatible with an automatic displacement means that can have high displacement speeds. This type of sensor is also particularly suited to transparent materials, such as sheets of mineral glass, for which the optical sensors that require reflective or opaque surfaces to operate are unsatisfactory.

The automatic displacement means 1003 can be an articulated automaton arm provided with six degrees of freedom. The use of such an arm has the advantage of ensuring the reproducibility of the travel of a trajectory along the dished surfaces, and of limiting the variations of height of the detection means with respect to the dished surface, notably in the zones of high curvature.

The method of the invention is particularly suited to the measurement of the relief or curvature deviations between the dished surfaces 1001*a* of a plurality of transparent materials 1001 to be assessed and a dished surface 1001*a* of a reference transparent material 1001. More specifically, it is suited to the quality inspection of the dished surfaces of the glass sheets leaving production or after the forming thereof, for example by bending. In this sense, the reference materials and the assessment material can respectively be a reference glass sheet and assessment glass sheets. Also, the reference glass sheet and the assessment glass sheets can be likely to form glass sheets of a reference glazing for a transport means and assessment glazings for the same transport means, respectively.

In one embodiment, illustrated in FIG. 5, the method of the invention comprises a second assembly comprising a second automatic displacement means 5001 onto which is fixed a second contactless detection means (not represented). This second assembly can operate simultaneously with the first assembly comprising the first automatic displacement means 1003 and the first contactless detection means 1002 in the execution of the steps (a) and (b) of the method of the invention. A first advantage is a faster execution of the method of the invention. A second advantage is that it is possible to measure geometric relief or curvature deviations on dished surfaces 1001*a* of large dimension for which a single automatic displacement means can be unsuitable. A third advantage is that the first and second assemblies can have a reduced spatial bulk and thus be suited to sites where there is little space.

A system for implementing the method according to the invention is also a subject of the invention. The system is an automatic system for measuring geometric relief or curvature deviations between the dished surfaces 1001*a* of a plurality of materials 1001 to be assessed and a dished surface 1001*a* of a reference material 1001, said system comprising an assembly formed by at least one automatic displacement means 1003 adapted to travel along at least one trajectory 1001*b* defined along dished surfaces 1001*a*, and at least one contactless detection means 1002 adapted to measure the relief height or curvature of dished surfaces 1001*a*, disposed on the automatic displacement means 1003 and synchronized with the movements of said automatic displacement means 1003;

said system being configured to:

measure, at selected measurement points along a defined trajectory 1001*b*, the relief height or curvature profile of the dished surface 1001*a* of the reference material 1001, and measure the relief height or curvature profile of the dished surface 1001*a* of each material 1001 to be assessed, at the same selected measurement points along the same trajectory 1001*b*, in the same conditions of travel along said trajectory 1001*b* by the automatic displacement means 1003 and according to the same angle of acquisition by the contactless detection means 1002 at the same measurement point as for the dished surface 1001*a* of the reference material 1001.

The system according to the invention can further comprise a computation unit configured to calculate, at the selected points, the difference between the relief height or curvature profiles of the dished surfaces 1001*a* of each assessment material 1001 and the relief height or curvature profile of the dished surface 1001*a* of the reference material 1001.

The contactless detection means 1002 is fixed onto the automatic displacement means 2003 using a fixing means. Any appropriate fixing means can be used. Preferably, the fixing means can have a thermal conductivity making it possible to discharge the heat associated with a heating of the contactless sensor. Such heating is indeed likely to disrupt its operation, notably when it is an electronic detection means, through the appearance of an electronic noise disturbing its signal. Such heating can, for example, be provoked by a prolonged use of the contactless detection means. The fixing means can advantageously have a thermal conductivity greater than 100 $W \cdot K^{-1} \cdot m^{-1}$, preferably greater than 200 $W \cdot K^{-1} \cdot m^{-1}$. An example of suitable material for the fixing means is aluminum.

The automatic displacement means 1003 can be an articulated automaton arm provided with six degrees of freedom. The use of such an articulated arm is advantageous in that it is sufficiently flexible to adapt to any type and any degree of curvature of the dished surfaces. The positioning of the contactless detection means with respect to the dished surfaces is simplified.

As indicated previously, the contactless detection means can advantageously be a chromatic confocal sensor.

In order to allow a spatial orientation of the dished surfaces according to angles of inclination corresponding to those likely to be provided during their use, the system can advantageously further comprise a support for the assessment materials and for the reference materials such that the dished surfaces of the assessment materials and of the reference material are spatially oriented according to angles of inclination corresponding to those likely to be provided during their use.

The method and the system according to the invention provide the following advantages:

- they can be used to inspect the quality of the relief or of the curvature of the dished surfaces of materials sensitive to any mechanical surface strain;
- they can be incorporated into continuous production, design or assembly lines;
- the inspection of the quality of the relief or of the curvature of the dished surfaces of a plurality of materials to be assessed is automated and can be performed all along the entire trajectory or at certain defined points of this trajectory;
- the trajectory along which the quality of the relief or of the curvature is inspected can be adapted according to the type of the materials and their use;
- no tem plate, such as those described in the prior art, is required to carry out the inspection of quality of the relief or of the curvature of the dished surfaces;
- the risks of degradation and/or of pollution of the dished surfaces are eliminated.

The invention claimed is:

1. An automated method for measuring geometric curvature deviations between dished surfaces of a plurality of materials to be assessed and a dished surface of a reference material, said method comprising the following steps:
   (a) measuring, at selected measurement points along a defined trajectory, of a curvature profile of the dished surface of the reference material using an optical contactless detection system, said optical contactless detection system being disposed on an automatic displacement system comprising a movable arm travelling along said trajectory synchronously with the measurement of the height of the relief by the optical contactless detection system;
   (b) measuring the curvature profile of the dished surface of each material to be assessed, at a same selected measurement points along the same trajectory, in same conditions of travel along said trajectory by the automatic displacement system and according to a same angle of acquisition by the optical contactless detection system at the same measurement point as for the dished surface of the reference material during step(a);
   (c) calculating, by computer, at the selected points, a difference between the curvature profiles of the dished surface of each material to be assessed obtained in step (b) and a relief height or curvature profile of the dished surface of the reference material obtained in step (a).

2. The automated method for measuring geometric deviations of curvature between the dished surfaces of a plurality of materials to be assessed and a dished surface of a reference material as claimed in claim 1, further comprising, after step (c), a step (d) of comparing, at selected measurement points, the values of the differences calculated during step (c) with tolerance values previously defined at each of said points.

3. The automated method for measuring geometric curvature deviations between the dished surfaces of a plurality of materials to be assessed and a dished surface of a reference material as claimed in claim 1, further comprising, before step (a), a step (a') of calibrating a reproducibility of spatial positionings of an assembly formed by the automatic displacement system and the optical contactless detection system in the space of the trajectory likely to be travelled along in the step (a), said step (a') comprising the following substeps:
   (a'1) defining a plurality of points of calibration of known spatial coordinates in a first reference frame of reference in the space of the trajectory likely to be travelled along in the step (a);
   (a'2) acquiring an assembly formed by the automatic displacement system and the optical contactless detection system of the spatial coordinates of said calibration points in the reference frame of reference of said assembly formed by the automatic displacement system and the optical contactless detection system;
   (a'3) calculating, by computer, a statistical correlation function between the spatial coordinates obtained in step (a'1) and the spatial coordinates obtained in the step (a'2);
   (a'4) implementing the statistical correlation function in a device for controlling the movements of said assembly formed by the automatic displacement system and the optical contactless detection system.

4. The automated method for measuring geometric curvature deviations between the dished surfaces of a plurality of materials to be assessed and a dished surface of a reference material as claimed in claim 3, wherein the calculation of statistical correlation function is performed using a least squares regression method.

5. The automated method for measuring geometric relief or curvature deviations between the dished surfaces of a plurality of materials to be assessed and a dished surface of a reference material as claimed in claim 1, wherein steps (b) and (c) are executed successively and continually on the dished surfaces of the materials.

6. The automated method for measuring geometric curvature deviations between the dished surfaces of a plurality of materials to be assessed and a dished surface of a reference material as claimed in claim 1, wherein the trajectory is defined using a digital model of the reference dished surface.

7. The automated method for measuring geometric curvature deviations between the dished surfaces of a plurality of materials to be assessed and a dished surface of a reference material as claimed in claim 1, wherein the dished surfaces of the assessment materials and of the reference material are spatially oriented according to angles of inclination corresponding to those likely to be provided during their use.

8. The automated method for measuring geometric curvature deviations between the dished surfaces of a plurality of materials to be assessed and a dished surface of a reference material as claimed in claim 1, wherein the optical contactless detection system is a chromatic confocal sensor.

9. The automated method for measuring geometric curvature deviations between the dished surfaces of a plurality of materials to be assessed and a dished surface of a reference material as claimed in claim 1, wherein the automatic displacement system is an articulated automaton arm provided with six degrees of freedom.

10. An automated method for measuring geometric curvature deviations between dished surfaces of a plurality of materials to be assessed and a dished surface of a reference material, said method comprising the following steps:
    (a) measuring, at selected measurement points along a defined trajectory, of a curvature profile of the dished surface of the reference material using an optical contactless detection system, said optical contactless detection system being disposed on an automatic displacement system comprising a movable arm travelling along said trajectory synchronously with the measurement of the height of the relief by the optical contactless detection system;
(b) measuring the curvature profile of the dished surface of each material to be assessed, at a same selected measurement points along the same trajectory, in same conditions of travel along said trajectory by the automatic displacement system and according to a same angle of acquisition by the optical contactless detection system at the same measurement point as for the dished surface of the reference material during step(a);
(c) calculating, by computer, at the selected points, a difference between the curvature profiles of the dished surface of each material to be assessed obtained in step (b) and a relief height or curvature profile of the dished surface of the reference material obtained in step (a), wherein the reference materials and the assessment material are, respectively, a reference sheet of glass and assessment sheets of glass.

11. The automated method for measuring geometric curvature deviations between the dished surfaces of a plurality of materials to be assessed and a dished surface of a reference material as claimed in claim 10, wherein the reference sheet of glass and the assessment sheets of glass are likely to form glass sheets of a reference glazing for a transportation system and assessment glazings for the same transportation system respectively.

12. An automatic system for measuring geometric curvature deviations between the dished surfaces of a plurality of materials to be assessed and a dished surface of a reference material, said system comprising an assembly formed by at least one automatic displacement system comprising a movable arm adapted to travel along at least one trajectory defined along dished surfaces, and at least one optical contactless detection system adapted to measure a relief height or curvature of dished surfaces, disposed on the automatic displacement system and synchronized with the movements of said automatic displacement system;

said system being configured to:

measure, at selected measurement points along a defined trajectory, the relief height or curvature profile of the dished surface of the reference material, and measure the relief height or curvature profile of the dished surface of each material to be assessed, at the same selected measurement points along the same trajectory, in the same conditions of travel along said trajectory by the automatic displacement system and according to a same angle of acquisition by the optical contactless detection system at the same measurement point as for the dished surface of the reference material.

13. The automatic system for measuring geometric curvature deviations between the dished surfaces of a plurality of materials to be assessed and a dished surface of a reference material as claimed in claim 12, further comprising a computation unit configured to calculate, at the selected points, a difference between the relief height or curvature profiles of the dished surfaces of each assessment material and the relief height or curvature profile of the dished surface of the reference material.

14. The automatic system for measuring geometric curvature deviations between the dished surfaces of a plurality of materials to be assessed and a dished surface of a reference material as claimed in claim 12, wherein the optical contactless detection system is disposed on the automatic displacement system using a fixing system having a thermal conductivity greater than 100 $W \cdot K^{-1} \cdot m^{-1}$.

15. The automatic system for measuring geometric curvature deviations between the dished surfaces of a plurality of materials to be assessed and a dished surface of a reference material as claimed in claim 12, wherein the automatic displacement system is an articulated automaton arm provided with six degrees of freedom.

16. The automatic system for measuring geometric curvature deviations between the dished surfaces of a plurality of materials to be assessed and a dished surface of a reference material as claimed in claim 12, wherein the optical contactless detection system is a chromatic confocal sensor.

17. The automatic system for measuring geometric relief or curvature deviations between the dished surfaces of a plurality of materials to be assessed and a dished surface of a reference material as claimed in claim 12, further comprising a support for the assessment materials and for the reference material such that the dished surfaces of the assessment materials and of the reference material are spatially oriented according to angles of inclination corresponding to those likely to be provided during their use.

18. The automatic system for measuring geometric curvature deviations between the dished surfaces of a plurality of materials to be assessed and a dished surface of a reference material as claimed in claim 14, wherein the thermal conductivity is greater than 200 $W \cdot K^{-1} \cdot m^{-1}$.

* * * * *